Jan. 23, 1962  R. G. YOUNG  3,018,403
REFLECTOR LAMP
Filed March 5, 1958  3 Sheets-Sheet 1
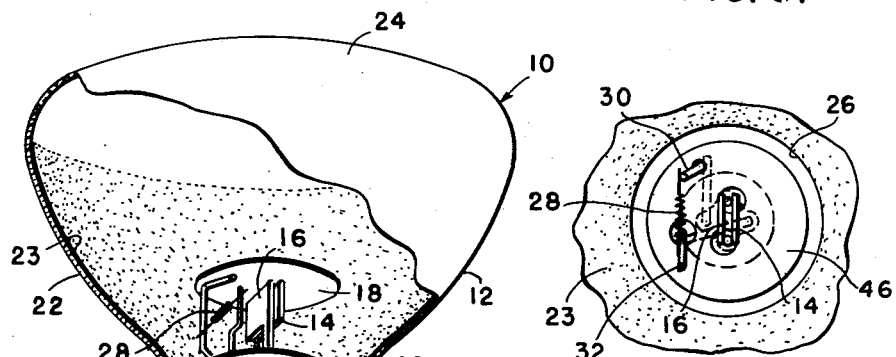
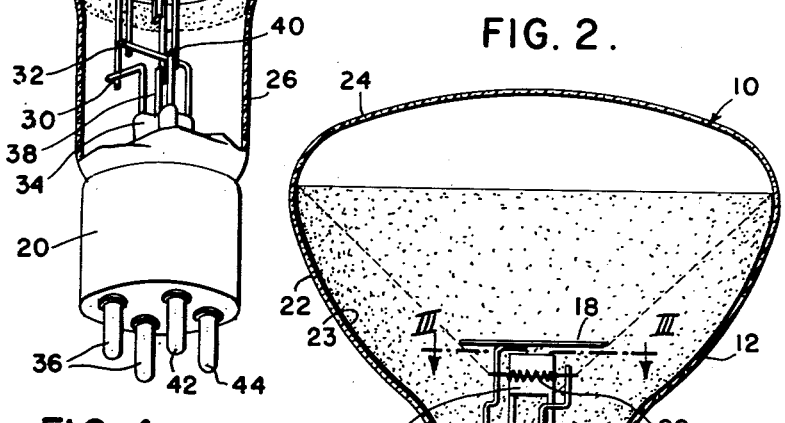
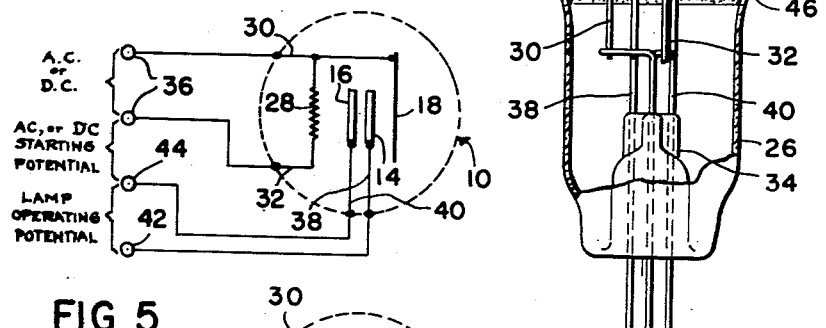
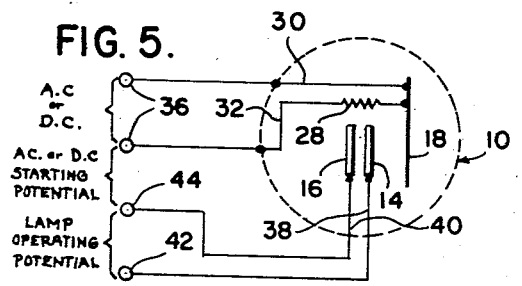
INVENTOR.
ROBERT G. YOUNG.
BY W. D. Palmer
ATTORNEY.

Jan. 23, 1962 R. G. YOUNG 3,018,403
REFLECTOR LAMP
Filed March 5, 1958 3 Sheets-Sheet 2
FIG. 6.
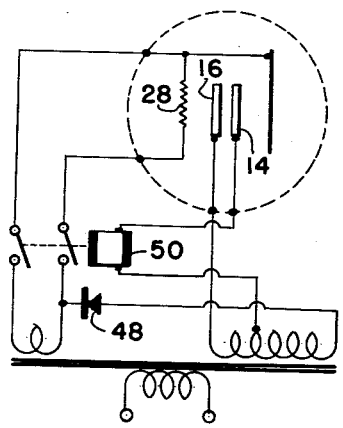
FIG. 7.
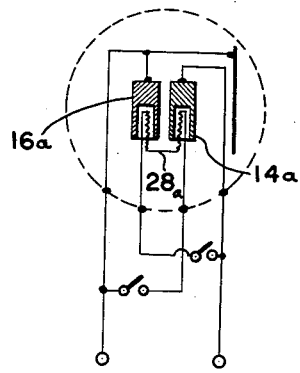
FIG. 8.
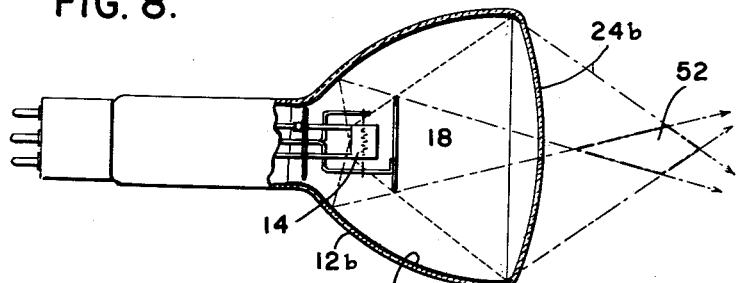
FIG. 9.
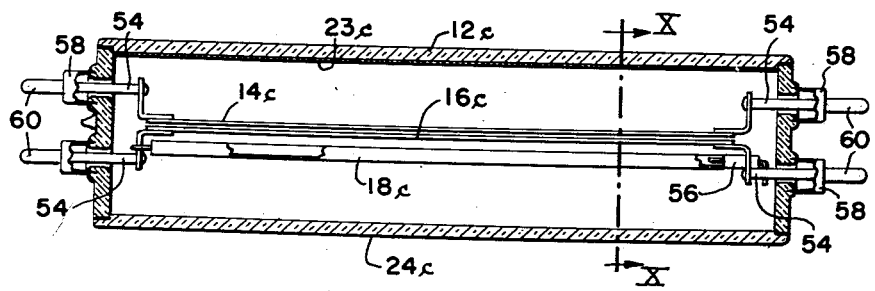
FIG. 10.
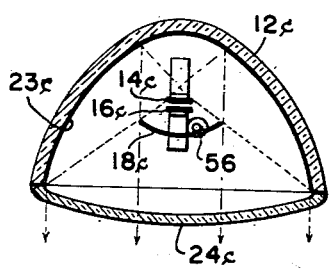
FIG. 11.
FIG. 12.
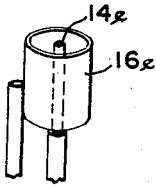
INVENTOR.
ROBERT G. YOUNG
BY
W. D. Palmer
ATTORNEY Jan. 23, 1962     R. G. YOUNG     3,018,403
REFLECTOR LAMP Filed March 5, 1958     3 Sheets-Sheet 3

INVENTOR.
ROBERT G. YOUNG.
BY
*W. D. Palmer*
ATTORNEY

United States Patent Office 3,018,403
Patented Jan. 23, 1962

1

3,018,403
REFLECTOR LAMP
Robert G. Young, Nutley, N.J., assignor to Westinghouse Electric Corporation, East Pittsburgh, Pa., a corporation of Pennsylvania
Filed Mar. 5, 1958, Ser. No. 719,289
9 Claims. (Cl. 313—114)

This invention relates to reflector lamps and, more particularly, to vacuum-type reflector lamps.

In the general design of incandescent lamps, a vitreous envelope surrounds an incandescible filament which is adapted to be energized by electrical potential. Such incandescible filaments are normally fabricated of refractory metal such as tungsten, and are usually provided with a coiled or a coiled-coil configuration. Also, such lamps have either an evacuated envelope or an inert-gas-filled envelope. Incandescent lamps having an inert-gas fill normally can be operated at higher filament temperatures in order to increase the percentage of radiations which fall within the eye-sensitive regions of the visible spectrum. Incandescent lamps which have an evacuated envelope are normally designed to be operated at somewhat lower filament temperatures, with corresponding sacrifice in efficiency, inasmuch as higher filament operating temperatures result in excessive vaporization of the tungsten onto the lamp envelope. Thus the vaporization of the refractory filament has constituted a problem both with respect to contaminating the lamp envelope and also with respect to short life, inasmuch as the vaporization of the refractory filament is a factor limiting the lamp life. Accordingly, in heat lamps and other types of radiation sources, a primary factor in determining the useful life of the lamp has been the vaporization of the incandescent filament and the contamination of the envelope wall.

Another type of light source is a projection lamp, wherein coiled refractory filamentary material is normally mounted in either a planar or bi-planar configuration in order to furnish as uniform a light source as possible for projection purposes. Such planar or bi-planar light sources, however, are still comparatively non-uniform in brightness and in order to achieve the effect of uniform brightness, it is normally necessary to defocus the light somewhat, with an attendant decrease in brightness.

In order to overcome the foregoing and other difficulties of and objections to the prior art, it is the general object of this invention to provide a reflector lamp which has a very long life.

It is a further object to provide a reflector-type heat lamp which has a very long life.

It is another object to provide a reflector lamp which has a very uniform light source.

It is an additional object to provide a long-life reflector lamp having a very uniform light source.

It is still another object to provide various embodiments for reflector lamps having either a very long life or a very uniform light source, or both.

The aforesaid objects of the invention, and other objects which will become apparent as the description proceeds, are achieved by providing a reflector lamp of the evacuated type with an incandescible source comprising a pair of spaced, massive, electrically-conducting and refractory electrodes within the lamp envelope, which electrodes are adapted to be maintained by alternating potential in an incandescent and electron-emissive state. One portion of the lamp envelope is adapted to function as a window to pass the radiations generated by the incandescible source. A selected surface included within the confines of the envelope is adapted to be maintained in a radiation-reflecting state during the useful operation of the lamp. There is also provided within the envelope a shield which acts to keep the envelope window uncon-

2 taminated during the life of the lamp. The electrodes, the shield, the window and the reflecting surface are all provided with such size and configuration and are so positioned with respect to one another that during the useful operation of the lamp, direct radiations from the lamp electrodes toward the envelope window are intersected by the shield. Also, a substantial portion of direct radiations emanated from the electrodes are directed toward the reflecting surface in such a manner that these radiations will strike the reflecting surface at such angles of incidence that reflections therefrom will be directed toward the envelope window and will not be intersected by the shield. Thus the shield acts to protect the envelope window from any contamination by evaporating refractory material. The reflecting surface will become coated by evaporating refractory material from the electrodes, but this evaporated material is utilized in a beneficial manner as the reflecting medium.

For a better understanding of the invention, reference should be had to the accompanying drawings wherein:

FIG. 1 is a perspective view of a reflector lamp constructed in accordance with the instant teachings;

FIG. 2 is an elevational view, partly in section, of the lamp as shown in FIG. 1;

FIG. 3 is a fragmentary sectional view, taken on the line III—III in FIG. 2 in the direction of the arrows;

FIG. 4 is a diagrammatic view of the electrode and starting-element arrangement for the lamp as shown in FIGS. 1 and 2;

FIG. 5 is a diagrammatic view of an alternative electrode and starting element arrangement;

FIG. 6 is a diagrammatic view of still another alternative electrode and starting element arrangement;

FIG. 7 is a diagrammatic view of a further alternative starting element and electrode arrangement;

FIG. 8 is an elevational view, partly in section, illustrating an alternative embodiment for the lamp as shown in FIGS. 1 and 2;

FIG. 9 is an elevational view, partly in section, of another alternative lamp embodiment wherein the electrodes are elongated and are longitudinally disposed within an elongated envelope;

FIG. 10 is a cross-sectional view taken on the lines X—X in FIG. 9 in the direction of the arrows;

FIG. 11 is a perspective view of an alternative electrode arrangement as may be used with the lamp shown in FIG. 9;

FIG. 12 is a further alternative electrode arrangement as may be used with the lamps shown in either FIGS. 2, 8 or 9;

Figure 13:
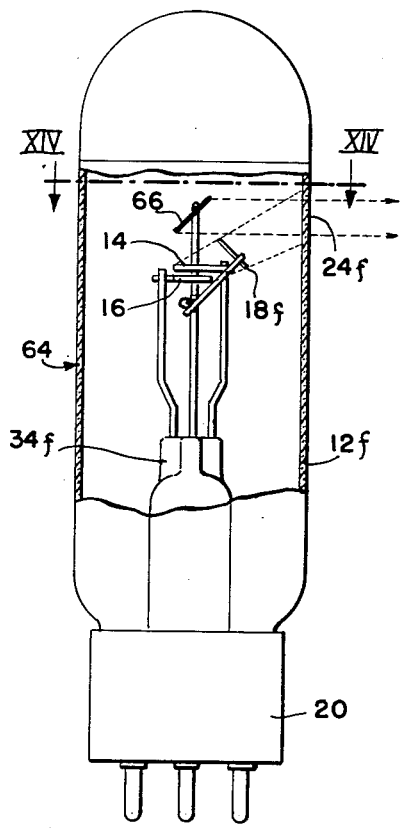
FIG. 13 is a still-further alternative embodiment and illustrates a reflector-type projection lamp.

With specific reference to the form of the invention illustrated in the drawings, in FIGS. 1 and 2 are shown a reflector lamp 10 which generally comprises an evacuated envelope 12, refractory electrodes 14 and 16 positioned within the envelope, shield 18 positioned within the envelope and base 20 connected to the envelope to facilitate energization for the lamp. The envelope 12 comprises a selected section 22 having an interior surface 23 which is intended to be maintained radiation reflecting during useful operation of the lamp, a window portion 24 which is intended to be maintained radiation transmitting during operation of the lamp and a neck portion 26 to which the lamp base 20 is attached. In the embodiment as shown in FIGS. 1 and 2, the reflecting surface 23 within the envelope 12 has a generally parabolic configuration and the electrodes 14 and 16 desirably are positioned proximate the focus of the parabolic surface 23.

The electrodes 14 and 16 in the embodiment as shown comprise a pair of spaced plates of electrically-conducting, refractory metal such as tungsten, tantalum or molybdenum, for example. These spaced plates may have any predetermined configuration and may be generally square as shown. The mass of each of these spaced electrodes is considerably greater than the mass of the usual filamentary-type coil as used in an incandescent lamp so that by comparison, they can be considered as massive. Desirably the spaced electrodes as shown in FIGS. 1 and 2 are substantially parallel in order that the electrode heating during operation of the lamp will be substantially uniform. It may be indicated in some cases, however, to offset the electrodes with respect to one another so that a uniform heating of same will not be achieved.

A starting element 28 is positioned proximate the electrode 16 and serves initially to energize the lamp electrodes. The starting element 28 may comprise any refractory metal such as tungsten, molybdenum or tantalum, for example, and while a tungsten coil is preferred, the element 28 may take the form of a strip, for example. The starting element 28 is maintained in position by a pair of supporting lead conductors 30 and 32 which are sealed through the conventional stem press 34 of the lamp in order to facilitate electrical connection to the heater element base pins 36, which form a part of the lamp base 20. The spaced and massive electrodes 14 and 16 are respectively supported in position by separate lead conductors 38 and 40, which lead conductors are also sealed through the conventional stem press 34 and are respectively electrically connected to electrode base pins 42 and 44 which also form a part of the lamp base 20.

The shield 18 is positioned in a predetermined location within the lamp envelope intermediate the window 24 and electrodes 14 and 16 and in the embodiment as shown are supported in such position by the lead conductor 30. A second or rear shield 46 is desirably provided proximate the neck portion 26 of the lamp envelope 12 in order to thermally insulate the base portion of the lamp and is supported in position by the lead conductor 30.

In the initial fabrication of the lamp, the parabolic inner surface 23 of envelope 12 need not be made radiation-reflecting since the tungsten which is evaporated from the electrodes during operation of the lamp will cause this portion of the envelope to become radiation-reflecting after the lamp has been operated for a short time. It may be desirable, however, to provide the parabolic envelope surface 23 with a thin coating of vacuum-metallized aluminum or with a deposited coating of vaporized tungsten, for example, so that the lamp initially operates in the desired manner. The lamp electrodes 14 and 16, the shield 18, the envelope window portion 24, and the reflector portion 23 are provided with such size and configuration and are so positioned with respect to one another that during useful operation of the lamp, direct radiations from the electrodes 14 and 16 toward the envelope window 24 are intersected by the shield 18 and a substantial portion of direct radiations emanated from the electrodes 14 and 16 in a direction toward the envelope reflecting surface 23 will have such angles of incidence thereon that reflections therefrom will be directed towards the envelope window 24 and will not be intersected by the shield 18. As a specific example, the electrodes 14 and 16 each comprise tungsten plates measuring 1 cm. by 1 cm. by 0.060 inch thick. The spacing between the electrodes is 0.060 inch and they are positioned proximate the focal point of a conventional R40 bulb. Of course the electrodes could be made larger or smaller if desired and the electrode spacing, etc. may be varied. The shield 18 is fabricated of a circular tantalum disc of a thickness of 0.01 inch and a diameter of 1 7/16 inches and it is positioned 6 mm. in front of the closest portion of the electrodes. The rear shield 46 is also fabricated of a similar tantalum disc and both shields are electrically insulated from the electrode leads 38 and 40 and starting-element lead 32. The shields could be fabricated of non-conducting material such as ceramic, if desired.

The electrodes 14 and 16 and starting element 28 are shown in diagrammatic view in FIG. 4 and in the operation of the lamp, an A.C. or D.C. electrical potential is applied across the base pins 36 in order to cause the starting element 28 to become incandescent. Simultaneously, the lamp operating potential, which is 430 volts A.C. for example, is applied across the base pins 42 and 44 and an additional A.C. starting potential such as 1500 volts is applied between either of the base pins 36 and the base pin 44. This additional starting potential could be D.C. if desired, with the starting element 28 made negative with respect to the nearest electrode 16. As the starting element 28 becomes incandescent, it will heat the nearest electrode 16. At relatively high temperatures such as 2550° K., tungsten is electron-emissive as well as incandescent and the electrode 16 will be heated by the starting element 28 by both thermal radiation and by electron bombardment. As soon as the electrode 16 has become sufficiently electron emissive in nature, the electrons emitted therefrom will bombard the other electrode 14 on alternate half cycles of the A.C. energizing potential. This will cause the electrode 14 to become incandescent and electron-emitting in nature, after which the starting element 28 is deenergized by manually or automatically removing the potential applied across base pins 36 and the additional starting potential applied between the starting element 28 and the nearest electrode 16. The electrodes 14 and 16 will then maintain one another in an electron-emitting and incandescent state by the electron bombardment which occurs therebetween. Since the electrodes are operated at high temperatures such as 2550° K., for example, there will be an appreciable loss of refractory material by evaporation and most of this vaporized material will be deposited on the envelope parabolic surface 23. Since the material vaporized from the electrodes travels in straight lines, there will be no deposition of such vaporized material on the window portion 24 of the envelope 12 as the shield 18 is interposed between the electrodes 14 and 16 and the envelope window 24. Thus the envelope window 24 will remain clear. Radiations which are generated by the incandescent electrodes 14 and 16 will be emitted in all directions and a substantial portion of these radiations will be directed toward the envelope reflecting surface 23. Since the electrodes are positioned proximate the focus of the parabolic reflecting surface 23, the angles of incidence of radiations emitted from the electrodes 14 and 16 will cause reflections from the surface 23 to be directed toward the envelope window 24. The cutoff for vaporized refractory material is shown by dotted lines in FIG. 2, which illustrates the manner in which the envelope window 24 is maintained light transmitting.

While a specific embodiment has been described in detail, it should be understood that the electrode configuration and spacing and the lamp operating characteristics may be varied considerably. In explanation, the lamp operating voltage will vary with the electrode spacing and the current density. The temperature at which the electrodes operate will vary with the lamp operating voltage and current density and to a limited extent with the electrode dimensions.

Vaporized refractory material is not as good a reflector for visible light as silver or aluminum and vaporized tungsten is only about 50% as good as silver as a reflector of visible light. In the infrared regions, however, vaporized tungsten is from 75% to 85% as good as silver as a reflector. It should be pointed out, however, that the instant electrodes can be operated at a much higher temperature, if desired, as the vaporization of the refractory material is a benefit rather than a detriment so that radiations which are lost through the lesser reflectivity of the vaporized tungsten may be offset by increased operating temperature for the electrodes. In addition, the instant lamp functions particularly well as a heat lamp.

The vaporization of the refractory metal of which the electrodes 14 and 16 are formed is a function of the temperature at which such electrodes are to be operated. For the embodiment as described, at an operating temperature of 2550° K. for example, one mil of tungsten will be evaporated in a period of 3,200 hours. At higher operating temperatures, the tungsten is evaporated in a more rapid fashion and at an operating temperature of 2700° K., for example, one mil of tungsten will be evaporated in a period of 430 hours. For heat lamp application, an operating temperature of 2550° K. is quite satisfactory and inasmuch as the electrodes have a total thickness of 60 mils, a total life for the lamp of 50,000 hours is readily achieved and even this figure may be greatly extended by using thicker electrodes. This is a much longer life than is realized from present heat lamps.

In FIG. 5 is shown in diagrammatic form another heater arrangement wherein the starting element 28 is positioned proximate both electrode plates 14 and 16. The operation of such an embodiment would be identical with that as described for the embodiment shown in FIG. 4, except that both electrode plates 14 and 16 are heated simultaneously to an incandescent and electron-emissive state.

In FIG. 6 is shown in diagrammatic form another alternative embodiment for starting the lamp, wherein the starting element 28 is placed proximate the electrode 16 as shown in FIG. 4. If an A.C. starting potential is applied between the starting element 28 and the nearest electrode 16, the element 28 may be bombarded on alternate half cycles by electrons emitted from the nearest electrode 16. This may tend to overheat the relatively small starting element 28. Such overheating can be avoided by providing a rectifier 48 in the electrical circuit between the electrode 16 and the starting element 28, which rectifier prevents electron bombardment of the element 28 when it is positive with respect to the electrode 16. The circuit shown in FIG. 6 is also provided with a relay 50 which acts to open the starting element circuit as soon as sufficient current is drawn by the electrodes 14 and 16 to cause their energization to become self-sustaining in nature.

In FIG. 7 is shown in diagrammatic form still another alternative electrode and starting element arrangement wherein the electrodes 14a and 16a are provided with a hollow core section adapted to contain series-connected starting elements 28a. In such an embodiment no additional starting potential need be utilized. Thus there will be a comparatively small amount of electron emission utilized in heating the electrodes 14a and 16a and these electrodes will be raised to an incandescent and electron-emissive state primarily by thermal heating.

In the foregoing lamp embodiment as shown in FIGS. 1 and 2, the starting element and associated electrical connections may be eliminated entirely if desired, and the lamp electrodes raised to an incandescent and electron-emissive state by an external heating means, such as a conventional RF heating means. It is desirable, however, to provide a separate lamp starting means within the envelope, such as described hereinbefore.

In FIG. 8 is shown an alternative embodiment for the lamp as shown in FIGS. 1 and 2 wherein the envelope 12b has a reflecting portion 23b which is provided with an elliptical configuration terminating in an envelope window 24b. The electrodes in such an embodiment are desirably positioned proximate one of the focal points of the ellipse and the reflected radiations will be concentrated proximate the second elliptical focus 52 which is located exterior to the lamp envelope 12b. In such a design, radiant energy may be concentrated, such as for high-intensity lighting and heating applications.

In FIGS. 9 and 10 are shown another embodiment of the lamp wherein elongated electrodes 14c and 16c are longitudinally disposed within an elongated envelope 12c. These electrodes comprise spaced rectangular metal plates having width, thickness and spacing dimensions as in the embodiment shown in FIGS. 1 and 2 and the shield 18c has the cross-sectional configuration of a hollow circular segment. If the shield 18c is fabricated of metal and is supported by the lead conductors 54 as shown, it should be insulated from the supporting leads by a suitable insulator 56. In the embodiment as shown in FIG. 9, no starting element has been provided and such a lamp may be started by an external means such as conventional RF heating. A simple starting element arrangement as shown in FIGS. 2 and 4 may be provided and it normally will be necessary to start only one small portion of the elongated electrodes 14c and 16c, after which the entire surface of the electrodes will become incandescent and electron emissive. The elongated envelope 12c may be provided with either an elliptical or a parabolic configuration for example, as in the embodiments shown in FIGS. 2 and 8, and a cross-sectional view of an elliptical envelope 12c is shown in FIG. 10. As in the preferred embodiment, the electrodes 14c and 16c are desirably positioned proximate the focal point of the envelope 12c and the shield 18c is positioned intermediate the electrodes and the window portion 24c of envelope 12c. In the fabrication of such an embodiment as shown in FIG. 9, the reflecting surface 23c of the envelope 12c may be pressed from glass and the envelope window portion 24c affixed thereto either by a fusing technique, as in conventional sealed-beam lamps, or by means of a suitable adhesive material such as epoxy resin if lamp operating temperatures are not excessive. The lead conductors 54 extend through base caps 58 and electrical connection may be made with the base caps through suitable base pins 60. The base caps 58 may be affixed to the lamp envelope either by glass fusing techniques or with a suitable epoxy resin seal, for example, if the lamp is to be operated at relatively low temperatures. Electrical energization is desirably effected through all of the base pins 60 positioned at the ends of the lamp envelope in order to minimize the effects of IR drop in the operating electrodes 14c and 16c.

In FIG. 11 is shown an alternative electrode arrangement for use in a lamp as shown in FIGS. 9 and 10. Such an alternative electrode arrangement comprises a first electrode 14d having the cross-sectional configuration of a hollow circular segment and a second electrode 16d which is formed as a rod. Both of these electrodes may be fabricated of tungsten, for example. Electrical connection to these electrodes is effected through suitable lead conductors 62.

In FIG. 12 is shown still another embodiment of an electrode arrangement incorporating two concentric electrodes. The outer electrode 16e is provided with a hollow-cylindrical configuration and the inner concentric electrode 14e has the form of a rod. Such an electrode arrangement may be made relatively short, for use in a lamp construction as shown in FIGS. 2 and 8, for example, or it may be elongated for use in a lamp construction as shown in FIG. 9.

Figure 14:
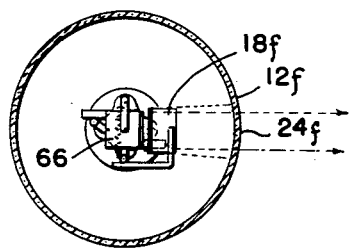
FIG. 14 is a cross-sectional view taken on the line XIV—XIV in FIG. 13 in the direction of the arrows.

In FIGS. 13 and 14 are shown yet another embodiment wherein the instant designs are incorporated into a projection lamp 64 in order to provide a very uniform light source which may have long life. Such a lamp comprises a conventional tubular vitreous envelope 12f which is evacuated and is provided with a conventional stem press 34f and base 20f and a window portion 24f protected by a shield 18f. Desirably the reflecting surface 66 contained within the envelope 12f is formed apart therefrom, although this reflecting surface may be placed on the inner envelope surface if a special envelope configuration is provided. In the design of such a lamp, the electrodes 14 and 16 may be as described for the embodiment as shown in FIG. 2 and the reflecting surface 66 desirably has a substantially flat configuration in order that light reflected therefrom will not be distorted. Thus no focal point governs the positioning of the electrodes. As in the embodiment as shown in FIG. 2, the electrodes 14 and 16, shield 18f, reflecting surface 66 and envelope window 24f are provided with such size and configuration and are so positioned with respect to one another that during useful operation of the lamp, direct radiations from the electrodes toward the window are intersected by the shield and a substantial portion of direct radiations from the electrodes toward the reflecting surface will have such angles of incidence thereon that reflections therefrom will be directed toward the envelope window 24f and not intersected by the shield 18f. It is desirable that the reflecting surface 66 have substantially the same configuration as the electrode 16. In addition, the configuration of the reflecting surface 66 may be varied in order to vary the resulting light pattern. In the foregoing embodiment, the electrodes may be operated at a very high temperature such as 3,200° K., for example, which temperature is uniform over the entire electrode surfaces to provide a very uniform light source. At this operating temperature, a life of approximately 50 hours is achieved. This is to be contrasted with the life which is normally obtainable from projection lamps, which life is quite short due to the relatively high operating temperature for the conventional filament.

Figure 15:
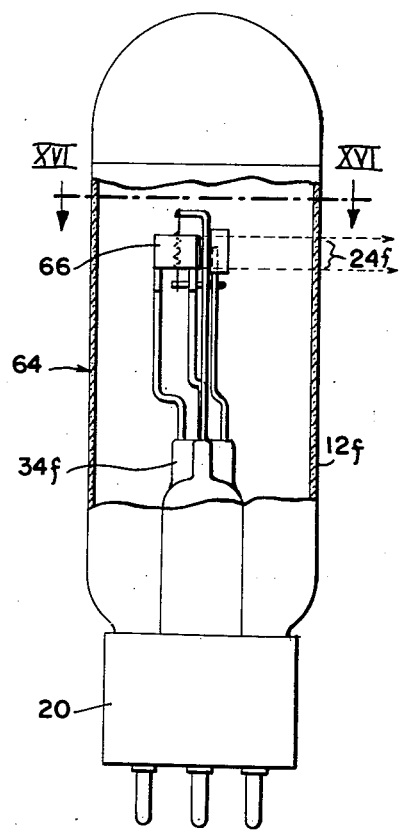
FIG. 15 is an alternative construction for the lamp as shown in FIG. 13.
Figure 16:
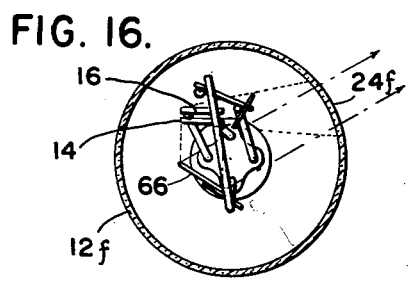
FIG. 16 is a cross-sectional view taken on the lines XVI—XVI in FIG. 15 in the direction of the arrows.

In the projection lamp embodiment as shown in FIGS. 13 and 14 the lamp electrodes have been positioned substantially perpendicular to the axis of the envelope. It may be desirable to position the electrodes 14 and 16 so that they parallel the axis of the envelope and such an embodiment is shown in FIGS. 15 and 16. In such a construction the electrodes 14 and 16 are desirably offset from the axis of the envelope 12f so that light reflected from the reflecting surface 66 will pass through the axis of the envelope 12f. This will minimize any refraction of the light as it passes through the envelope window portion 24f.

In either of the embodiments as shown in FIGS. 13 through 16, additional shielding means may be provided, if desired, to prevent excessive deposition of vaporized refractory material on portions of the envelope other than the window portion 24f, in order that the envelope will not operate at excessively high temperatures. In addition, the envelope may be provided with external heat-dissipating surfaces, as is usual with many types of projection lamps.

In any of the foregoing embodiments, the electrodes may be provided with any desired configuration. While they have been shown with square, rectangular and generally circular configurations, special designs such as numerals or letters, for example, may be provided for the electrodes.

As a further alternative embodiment, the rear shield 46 as shown in FIGS. 1, 2 and 8 may be eliminated, if desired, and a lamp generally as shown in FIGS. 1, 2 and 8 constructed in accordance with usual sealed-beam lamp techniques.

It will be recognized that the objects of the invention have been achieved by providing a reflector lamp which has a very long life or which has a very uniform light source, or both. In addition, there have been provided various embodiments for reflector lamps which have either a very long life or a very uniform light source, or both.

While best-known embodiments have been illustrated and described in detail, it is to be particularly understood that the invention is not limited thereto or thereby.

I claim:
1. A reflector-type lamp comprising: an elongated sealed and evacuated envelope; a longitudinally-disposed window forming a portion of said envelope and intended to be maintained radiation transmitting during lamp operation; said envelope having a selected longitudinally-disposed interior surface portion which is intended to be maintained radiation reflecting during useful operation of said lamp; the selected longitudinally-disposed interior surface portion of said envelope having a linear, longitudinally-disposed focus; a pair of spaced, massive, electrically-conducting and refractory electrodes formed of specular material positioned proximate the focus of the selected longitudinally-disposed interior surface portion of said envelope and adapted to be maintained by alternating electrical potential in an incandescent state during lamp operation by electron bombardment therebetween and at such temperature as to cause such electrodes to vaporize at a predetermined rate; a shield between said electrodes and said window; and said electrodes, said shield, said window and the selected longitudinally-disposed interior surface portion of said envelope having such size and configuration and so positioned with respect to one another that during useful operation of said lamp direct radiations from said electrodes toward said window are intersected by said shield and a substantial portion of direct radiations from said electrodes toward the selected longitudinally-disposed interior surface portion of said envelope have such angles of incidence thereon that reflections therefrom will be directed toward said window and not intersected by said shield.

2. A reflector-type lamp comprising: a sealed and evacuated envelope; a window forming a portion of said envelope and intended to be maintained radiation transmitting during lamp operation; a flat member included within the confines of said envelope and having a surface intended to be maintained radiation reflecting during useful operation of said lamp; a pair of spaced, flattened, massive, electrically-conducting and refractory electrodes within said envelope and adapted to be maintained by alternating electrical potential in an incandescent state during lamp operation by electron bombardment therebetween and at such temperature as to cause such electrodes to vaporize at a predetermined rate; a shield between said electrodes and said window; and said electrodes, said shield, said window and the flat surface of said member having such size and configuration and so positioned with respect to one another that during useful operation of said lamp direct radiations from said electrodes toward said window are intersected by said shield and a substantial portion of direct radiations from said electrodes toward the flat surface of said member have such angles of incidence thereon that reflections therefrom will be directed toward said window and not intersected by said shield.

3. A reflector-type lamp comprising: a sealed and evacuated envelope; a window forming a portion of said envelope and intended to be maintained radiation transmitting during lamp operation; a flat member included within the confines of said envelope and having a surface intended to be maintained radiation reflecting during useful operation of said lamp; a pair of spaced, flattened, massive, electrically-conducting and refractory electrodes formed of specular material positioned within said envelope and adapted to be maintained by alternating electrical potential in an incandescent state during lamp operation by electron bombardment therebetween and at such temperature as to cause such electrodes to vaporize at a predetermined rate; heating means within said envelope and proximate at least one of said electrodes and adapted to have an electrical potential applied thereto to heat at least one of said electrodes to an incandescent and electron-emissive state; a shield between said electrodes and said window; and said electrodes, said shield, said window and the flat surface of said member having such size and configuration and so positioned with respect to one another that during useful operation of said lamp direct radiations from said electrodes toward said window are intersected by said shield and a substantial portion of direct radiations from said electrodes toward the flat surface of said member have such angles of incidence thereon that reflections therefrom will be directed toward said window and not intersected by said shield.

4. A reflector-type lamp comprising: a sealed and evacuated envelope; a window forming a portion of said envelope and intended to be maintained radiation transmitting during lamp operation; said envelope having a selected interior surface which is intended to be maintained radiation reflecting during useful operation of said lamp; a pair of spaced, massive, electrically conducting and refractory electrodes formed of specular material positioned within said envelope and adapted to be maintained in an incandescent state during lamp operation by electron bombardment therebetween and at such temperature as to cause such electrodes to vaporize at a predetermined rate; a shield between said electrodes and said window; said electrodes, said shield, said window and the selected interior surface of said envelope having such relative size and configuration and so positioned with respect to one another that during useful operation of said lamp, radiations and vaporized material directed from said electrodes and toward said window are intersected by said shield, and a substantial portion of radiations directed from said electrodes and toward the selected interior surface of said envelope having such angles of incidence thereon that reflections therefrom will be directed toward said window and not intersected by said shield, with material vaporized from said electrodes and directed toward the selected interior surface of said envelope depositing thereon to maintain the selected interior surface of said envelope radiation reflecting.

5. A reflector-type lamp as specified in claim 4, wherein said electrodes are adapted to be energized by an alternating electric current.

6. A reflector-type lamp as specified in claim 4, wherein said electrodes are formed from material selected from one of the group consisting of tungsten, molybdenum and tantalum.

7. A reflector-type lamp as specified in claim 4, wherein an additional heating element is included within said envelope and proximate at least one of said electrodes and adapted to have an electrical potential applied thereto to heat at least one of said electrodes to an incandescent and electron-emissive state.

8. A reflector-type lamp as specified in claim 4, wherein said selected envelope interior surface is parabolic in configuration.

9. A reflector-type lamp as specified in claim 4, wherein said envelope has a generally elliptical configuration, and wherein said electrodes are positioned proximate one focal point of said elliptical envelope and the other focal point of said elliptical envelope is located exterior thereto.

References Cited in the file of this patent
UNITED STATES PATENTS

| | | |
|---|---|---|
| 1,616,812 | Lilienfeld | Feb. 8, 1927 |
| 1,705,377 | Robinson | Mar. 12, 1929 |
| 1,822,360 | Miesse | Sept. 8, 1931 |
| 2,020,055 | Friedrich | Nov. 5, 1935 |
| 2,167,777 | Rentschler | Aug. 1, 1939 |
| 2,189,786 | Fischer | Feb. 13, 1940 |
| 2,512,623 | Ferguson | June 27, 1950 |
| 2,744,209 | Ferguson | May 1, 1956 |
| 2,799,791 | Honing | July 16, 1957 |
| 2,876,375 | Marsh | Mar. 3, 1959 |
| 2,918,595 | Cressman | Dec. 22, 1959 |